Patented May 20, 1924.

1,494,943

UNITED STATES PATENT OFFICE.

OSCAR BALLY, OF BASEL, SWITZERLAND, ASSIGNOR TO THE FIRM: HACO-GESELL-SCHAFT A.-G. BERN, OF BERNE, SWITZERLAND.

ORGANIC BISMUTH COMPOUND.

No Drawing. Application filed January 22, 1924. Serial No. 687,864.

*To all whom it may concern:*

Be it known that I, OSCAR BALLY, a citizen of Switzerland, residing at Basel, Switzerland, have invented certain new and useful Improvements in Organic Bismuth Compounds, of which the following is a specification.

My invention refers to soluble organic bismuth compounds adapted for use as dyestuffs and disinfectants, and to the method of making same.

I have ascertained by experimental investigation that water soluble mordant dyestuffs such as for instance the sulfo acids of oxyanthraquinones, oxynaphthoquinones, gallocyanine dyestuffs and so on have the property of combining with bismuth hydroxid or certain bismuth salts to form water soluble colored compounds which are extraordinarily stable even in very dilute aqueous solutions.

These salts and their solutions, respectively, are adapted for use as disinfectants, but they are also well suited for use in dyeing textile fibres such as wool, cotton mordanted with tannic acid etc.

In practising my invention, I may for instance proceed as follows:—

Example I.

20 kilos alizarin monosulfonate of sodium are dissolved in 1500 liters of water. The solution is heated to boiling point and 20 kilos of freshly precipitated bismuth hydroxid are added. After several hours' boiling, there results a cherry to Bordeaux red colored solution which is separated by filtration from such bismuth hydroxid as may not have been dissolved. The filtrate can be boiled down to a predetermined concentration or even to dryness. In dry state it constitutes a brownish red powder which dissolves rather easily with a cherry to Bordeaux red color. The watery solution is stable; in a bath containing acetic acid, it dyes wool a brownish red.

Example II.

20 kilos alizarin monosulfonate of sodium are dissolved in 500 liters hot water and 20 kilos bismuth subnitrate are added during boiling. The solution, which at first has a yellowish color, gradually assumes a reddish brown tinge. Boiling is continued until no further change of shade can be ascertained. After filtration, the filtrate is evaporated to dryness. There results a brownish red powder which fairly easily dissolves in water with a brownish red color and dyes wool a flesh to brownish red shade.

Similar water soluble bismuth compounds are obtained by employing other than the above sulfonic acids of oxy ketone dyestuffs.

I wish it to be understood that I do not desire to be limited to the exact materials and operations hereinbefore described, as obvious modifications will occur to a person skilled in the art.

I claim:—

1. The method of making water soluble organic bismuth compounds adapted for use as dyestuffs and disinfectants, comprising treating bismuth hydroxid with a solution of a sulfonic acid of an alizarin dyestuff.

2. The method of making water soluble organic bismuth compounds adapted for use as dyestuffs and disinfectants, comprising treating a bismuth hydroxid derivative with a solution of a sulfonic acid of an alizarin dyestuff.

3. The method of making water soluble organic bismuth compounds adapted for use as dyestuffs and disinfectants, comprising treating a bismuth hydroxid salt with a solution of a sulfonic acid of an alizarin dyestuff.

4. The method of making water soluble organic bismuth compounds adapted for use as dyestuffs and disinfectants, comprising treating bismuth hydroxid with a solution of salt of a sulfonic acid of an alizarin dyestuff.

5. The method of making water soluble organic bismuth compounds adapted for use as dyestuffs and disinfectants, comprising treating a bismuth hydroxid derivative with a solution of salt of a sulfonic acid of an alizarin dyestuff.

6. The method of making water soluble organic bismuth compounds adapted for use as dyestuffs and disinfectants, comprising treating a bismuth hydroxid salt with a solution of salt of a sulfonic acid of an alizarin dyestuff.

7. The method of making water soluble organic bismuth compounds adapted for use as dyestuffs and disinfectants, comprising treating a boiling solution of 20 kilos alizarin monosulfonate of sodium in 1500 liters water with 20 kilos freshly precipitated bismuth hydroxid.

8. The method of making water soluble organic bismuth compounds adapted for use as dyestuffs and disinfectants, comprising treating a boiling solution of 20 kilos alizarin monosulfonate of sodium in 1500 liters water with 20 kilos freshly precipitated bismuth subnitrate.

9. As a new composition of matter, a bismuth salt of a sulfonic acid of an alizarin dyestuff, being fairly easily soluble in water, stable in watery solutions, dyeing wool in a bath containing acetic acid and having the properties of a disinfectant.

10. As a new composition of matter, a bismuth salt of alizarin monsulfonic acid of reddish to brownish color, fairly easily soluble in water, stable in watery solution, dyeing wool in a bath containing acetic acid a reddish to brownish shade and having the properties of a disinfectant.

In testimony whereof I affix my signature.

OSCAR BALLY.